United States Patent [19]

Koester

[11] Patent Number: 4,478,482
[45] Date of Patent: Oct. 23, 1984

[54] AXIAL SCANNING OPTICAL SYSTEM AND METHOD OF EXAMINING AN OBJECT PLANE

[76] Inventor: Charles J. Koester, 60 Kent Rd., Glen Rock, N.J. 07452

[21] Appl. No.: 262,329

[22] Filed: May 11, 1981

[51] Int. Cl.³ .................. G02B 21/00; G02B 21/16; G02B 21/17
[52] U.S. Cl. .................. 350/6.6; 350/507; 350/523; 350/320
[58] Field of Search .......... 350/6.6–6.91, 350/6.5, 6.1, 507, 523, 320

[56] References Cited

U.S. PATENT DOCUMENTS

| | | | |
|---|---|---|---|
| 3,360,659 | 12/1967 | Young | 350/6.7 |
| 3,547,512 | 12/1970 | Baer | 350/523 |
| 3,813,140 | 5/1974 | Knockeart | 350/6.8 |
| 4,003,627 | 1/1977 | Wu et al. | 350/6.8 |
| 4,170,398 | 10/1979 | Koester | 350/6.8 |

OTHER PUBLICATIONS

Brown, Nicholas, An Advanced Slit-Image Camera, in the *British Journal of Ophthamology*, (1972), 56, pp. 624–631.
Brown, Nicholas, Slit-Image Photography, in the *Trans. Ophthal. Soc., U.K.*, 89, 397, (1969).
Brown, Nicholas, Quantitative Slit-Image Photography of the Lens, *Trans. Ophthal. Soc., U.K.*, 62, (1972), pp. 303–317.
A Scanning Slit Microscope for Ophthical Sectioning, in *The Journal of the Optical Society of America*, 68, 1382, (1978), an abstract of the paper presented of Nov. 1, 1977.
Koester, C. J., A Scanning Mirror Microscope for Wide-Field Cornea Studies, Apr. 1979, *Investigative Ophthamology and Visual Science*, 8-2:45.
Koester, C. J., In Vivo Time-Lapse Specular Microscopy of Endothelia Would Repair, Apr. 1979, *Investigative Ophthamology and Visual Science*, abstract 9-3:00.
Koester, C. J. and C. W. Roberts, Cells for Sight: A New Wide Field Specular Microscope, presentation made before a Research to Prevent Blindness Seminar, 10/8/79.
Applications in Ophthamology for the Scanning Mirror Microscope, *Journal of the Optical Society of America*, 69, 1446, 1979.
Koester, C. J., Scanning Mirror Microscope with Optical Sectioning Characteristics: *Applied Optics*, Jun. 1, 1980, vol. 19, No. 11.

*Primary Examiner*—Jon W. Henry
*Attorney, Agent, or Firm*—Sandler & Greenblum

[57] ABSTRACT

A method of viewing an object plane with an optical instrument adapted to generate illumination for illuminating the object plane along an illumination axis and for imaging the image of the object plane along an image axis onto a final image plane. The object plane is positioned such that at least one of the illumination and image axes is at an angle which is non-normal relative to the object plane. The method includes the steps of:
 (a) scanning illumination across the object plane; and
 (b) imaging the object plane onto the final image plane.

An optical system for viewing an object plane with an optical instrument adapted to scan-illuminate the object plane along an illumination axis of an illumination system and for imaging the image of the object plane along an image axis of an image system onto a final image plane wherein at least one of the illumination and image axes is at an angle non-normal to the object plane.

55 Claims, 11 Drawing Figures

AXIAL SCANNING OPTICAL SYSTEM AND METHOD OF EXAMINING AN OBJECT PLANE

FIELD OF THE INVENTION

The invention relates to an axial scanning optical system for examining an object plane, the plane being positioned other than normal to the axis of the system, and to the method of using the system to examine such a plane.

DESCRIPTION OF PRIOR ART

Almost without exception, microscopes are designed to form an image of an object plane which is perpendicular or nearly perpendicular to the axis of the instrument. One notable exception is the slit-image camera developed by Nicholas Brown for macrophotography of the lens and cornea of the eye. This camera employs a tilted lens and/or a tilted film plane to achieve an image of an object plane which is inclined with respect to the instrument axis. Such an apparatus is quite effective for its intended purpose. However, the quantity of light available is limited by the low numerical aperture of the slit-lamp illumination system which is used with the slit-image camera. To achieve a narrow beam over an appreciable image width, the aperture of the slit beam must be stopped down. Furthermore, the magnification of the system is relatively low.

It is desirable to achieve similar results using a higher aperture illumination system and a higher magnification image system. A further goal is to incorporate the advantages of optical sectioning as described in U.S. Pat. Nos. 4,170,398 and 4,241,257, and in U.S. application Ser. No. 83,341, the disclosures of which are herein incorporated by reference.

SUMMARY OF THE INVENTION

It is, therefore, an object of the present invention to provide a device which is capable of forming an image of an object plane which may be parallel to the axis of the instrument.

The term "object plane" is not to be construed narrowly as being limited to strictly planar surfaces, but extends instead to any area or region that is imaged in an image plane or surface.

It is yet a further object of the invention to provide a device for illuminating only a single slit-shaped region of the object, the system being further adapted such that only light reflected or scattered from precisely the illuminated strip is accepted by the imaging system and brought to focus at the final image plane.

Generally, according to the invention, the object plane is illuminated and re-imaged on the final image plane. By using scanned slit illumination and imaging, it is possible to eliminate from the image any light scattered from other regions of the object. This feature permits the instrument to be used for the study of semi-transparent biological tissue and other semi-transparent materials in a manner never before possible. Thus, the invention permits one to view a section which is perpendicular to the surface of the object in which the object plane is located. Such examination was previously feasible only by sectioning the material perpendicular to its surface, mounting the section on a slide, and examining it with a conventional microscope. In some cases, a special technique was possible such as that employed for macrophotography by N. Brown.

Yet another advantage according to the inventive system is the increased illumination of the specimen which is achieved by virtue of the fact that a relatively high numerical aperture is used to project the image of the illuminated slit onto the object plane.

According to the invention, a method of viewing an object plane with an optical instrument is provided. The object plane is positioned such that at least one of the illumination and image axes of the instrument is at an angle which is non-normal relative to the object plane. The method comprises the steps of:

(a) successively scan illuminating portions of the object plane; and (b) imaging each of the successive portions of the object plane.

An optical system is provided for axially scanning an object plane with slit-shaped illumination, and simultaneously imaging the illuminated region onto a final image plane, wherein at least one of the illumination and image axes is non-normal to the object plane. The system comprises:

(a) illumination means for illuminating the object plane;

(b) scanning means for scanning the illumination across the object plane; and (c) image means for imaging the object plane onto the final image plane.

BRIEF DESCRIPTION OF THE DRAWINGS

The inventive system and method will now be described with reference to the annexed drawings, in which.

DESCRIPTION OF PREFERRED EMBODIMENTS

Briefly, the invention can be summarized as an illumination and imaging optical system in which illumination, preferably in the form of a strip of light, is projected onto an object plane and the image thereof projected to a final image plane. Most preferably, the strip of light is scanned across the object plane. The sweeping image of the scanned light strip may be stabilized, such as by a synchronously rotating reflector in the image section of the system. A slit may be placed at this stabilized image of the scanned light strip, for the purpose of removing stray light from the image. The stabilized image may in turn be synchronously sweep-scanned across the final image plane to lay down a composite strip-by-strip image of the object plane. According to the principle of the invention, optics and images are appropriately tilted or oriented relative to the illumination and image optical axes in accordance with the Scheimpflug condition such that the subject or object plane under investigation, which is generally longitudinal relative to the instrument, and may extend into an object from a surface thereof, is illuminated and imaged by the optical system.

The object plane is generally parallel to the axis of the instrument. The instrument axis may be defined as a line which bisects the angle between the illumination and image optical axes. An exception to this definition is discussed in connection with FIGS. 4 and 5. More broadly, therefore, the instrument axis may be defined to include the illumination axis, the imaging axis, and any axis between these two axes.

Figure 1:
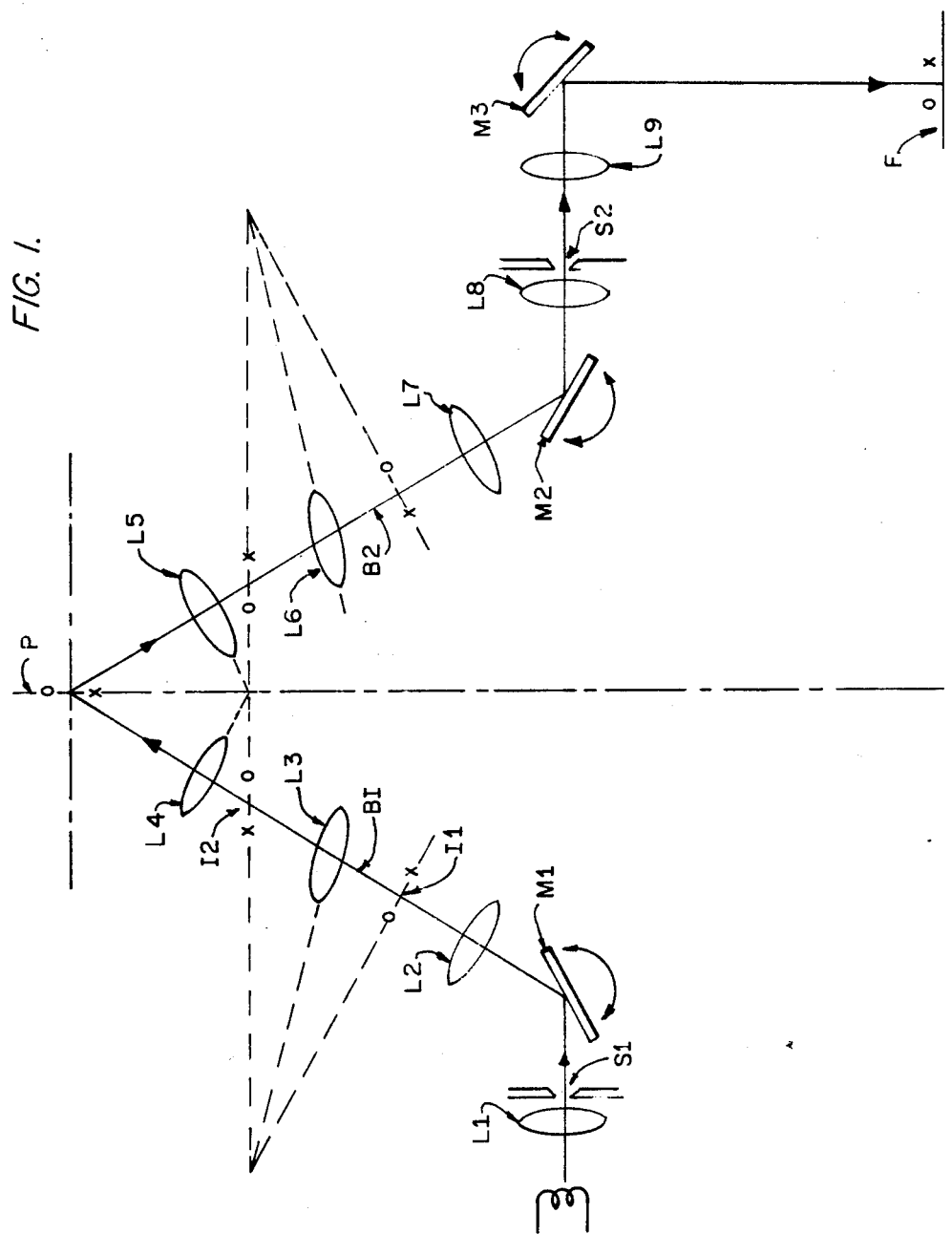
FIG. 1 is an optical diagram of a scanning microscope according to the invention.

As was noted above, the invention includes an illumination system and an imaging system. According to one embodiment of the invention, and as shown in FIG. 1, the complete system may utilize reflections from three synchronously rotating or oscillating mirrors represented in FIG. 1 as M1, M2, and M3. Light passing through lens L1 and slit S1 is directed by mirror M1 and lenses L2, L3, and L4 to the object plane P. As mirror M1 rotates clockwise, the image of the slit will scan from the position marked o to the position marked x. Each plane marked o-x is an image plane of the next preceding lens in the system.

The first stage of the imaging system comprises lens L5, L6, L7, mirror M2, and slit S2, and is symmetrical with the illumination system just described in the embodiment illustrated. When mirror M1 rotates clockwise, mirror M2 must rotate counterclockwise at the same angular velocity as mirror M1. Under these conditions, the illuminated strip and the object will always be re-imaged through slit S2. Thus, only the light reflected and scattered by the illuminated strip on plane P will be accepted by slit S2. Any light scattered elsewhere in the volume of the object will be attenuated or blocked entirely at slit S2.

In the second stage of the imaging system, the light which has passed through lens L8 and through slit S2 then passes through lens L9 before reaching mirror M3, which must be rotating counterclockwise when mirror M1 rotates clockwise. As mirror M3 rotates, the slit image is scanned across final plane F and a composite image of the object is reconstructed.

Lens L3 is tilted with respect to the illumination axis B1. This tilt is necessary to convert the scan, which is perpendicular to axis B1 at image I1, to a scan which is inclined to the axis at image I2. This arrangement is necessary for purposes of satisfying the Scheimpflug condition. According to this condition, when a lens is to be used to image an object plane onto an image plane which is inclined with respect to the object plane, a construction such as is illustrated in FIG. 1 is utilized. The object and image planes are extended until they intersect, forming a line perpendicular to the drawing. The intermediate lens is tilted such that the plane of the lens contains this line.

In the present instance, the object plane considered with respect to the Scheimpflug condition is that traced by image I1 of slit S1 as mirror M1 rotates. The image plane is at I2, and is tilted with respect to axis B1. As illustrated in FIG. 1, the plane of the lens is tilted so that it passes through the intersection of the image and object planes, i.e., the planes containing images I1 and I2.

Lens L4 must likewise obey the Scheimpflug condition with respect to image plane I2 and object plane P. In this instance, the conjugate planes at I2 and P of lens L4 are tilted at appropriate angles, with the result that lens L4 does not have to be tilted relative to illumination axis B1 while still satisfying the Scheimpflug condition. Lens L4 converts the illumination span from o to x at image plane I2 to a scan from o to x in the object plane P.

The requirements on lenses L5 and L6 are the same as those on lenses L4 and L3, respectively. These lenses serve, in effect, to rectify the image leaving the object plane. That is, the image formed by lens L6 lies in a plane normal to the image system axis B2. Of course, the phase of rotation of mirror M2 must match that of mirror M1 so that the image of illuminated slit S1 always falls on S2.

After passing through slit S2, the light passes through lens L9, which images slit S2 onto rotating mirror M3 and ultimately onto final image plane F. Reflection of the light by rotating mirror M3 causes the image of slit S2 to scan across final image plane F. The image of the object is thereby laid down strip-by-strip on final image plane F.

Lens L8 is a field lens whose function it is to image the limiting aperture which precedes the lens onto the limiting aperture which follows the lens. It thus assures that all rays passing through slit S2 are received by the optical system which follows. In some cases, field lens L8 will be unnecessary because lens L9 which follows has a large enough aperture to receive all the rays passed by the slit.

Mirrors M1, M2, and M3 were described above as "rotating". While continuously rotating mirrors could, in principle, be utilized, a more practical arrangement is to have the mirrors oscillating in a rotary motion. Thus, as used throughout the specification, the terms "oscillating" and "rotating" are used synonymously and interchangeably. It should be pointed out that synchronous oscillating mirrors are commercially available.

Since the system operates to illuminate only one strip of the object plane at a time, and since only this illuminated strip is transmitted by the imaging system, the instrument will image plane P to the exclusion of other portions of the object. With all but perfectly transparent objects, detail at a depth within the object is seen with greater clarity than is possible with conventional incident-light illumination. Since examination of such objects results in backscattered light from all depths within the object, which light obscures the desired image details, the inventive apparatus is of great advantage in reducing such backscattered light, and produces a clear and sharp image.

Figure 2A:
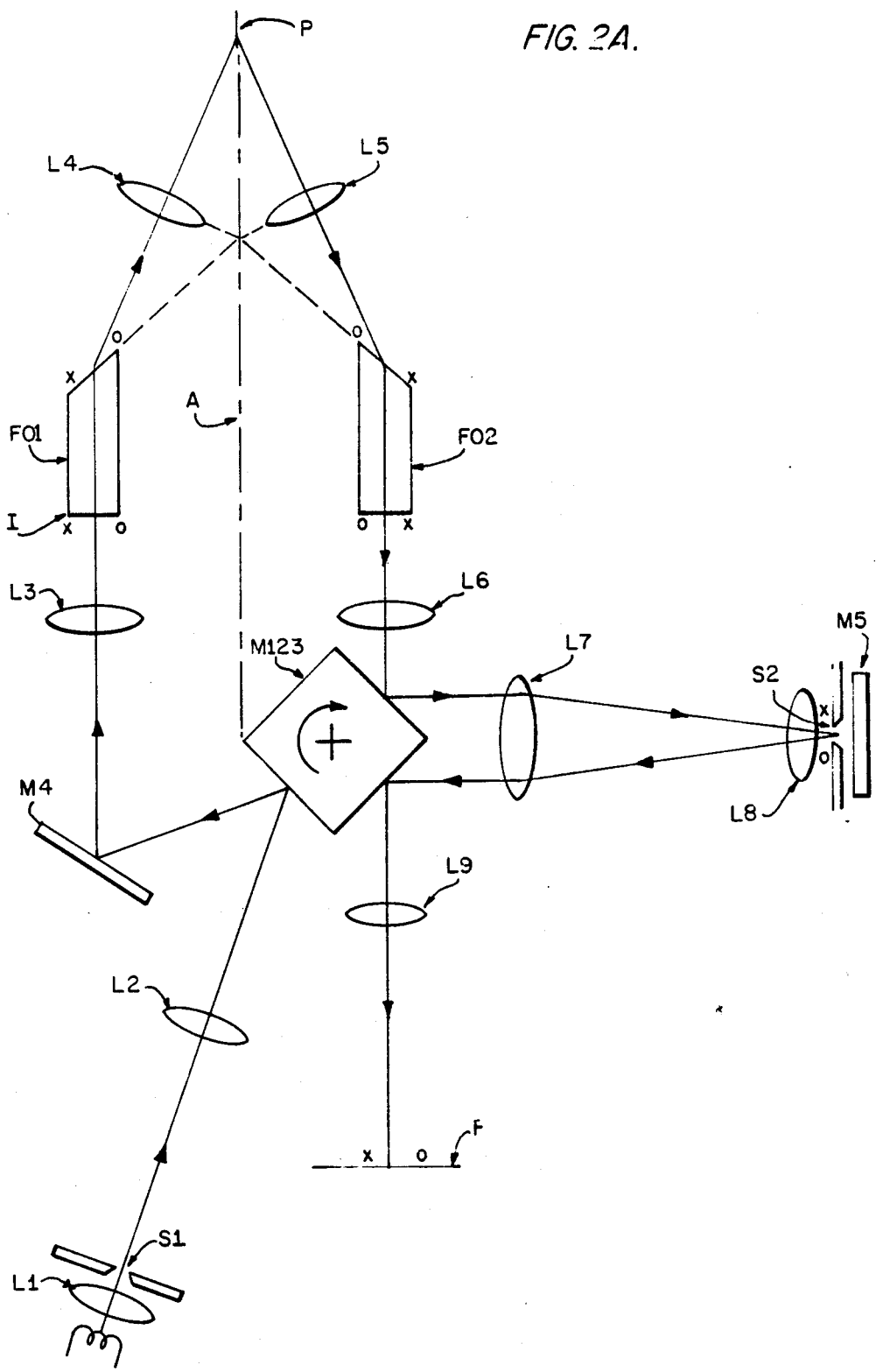
FIG. 2A is an optical diagram of a modified system according to the invention in which fiber optic bundles effect appropriate image tilting.

FIG. 2A illustrates a method which employs fused fiber optic bundles F01 and F02 to produce the tilt in the planes along the illumination and image axes. This arrangement avoids the use of lenses tilted relative to the axes of illumination and imaging. The particular arrangement also permits the use of a three-facet rotating mirror M123 instead of three individual rotating mirrors illustrated in FIG. 1.

In this system, light from lens L1, slit S1, and lens L2 is directed by rotating reflector M123 and by stationary mirror M4, and then imaged by lens L3 at image plane I. This slit image, which is scanned from o to x in image plane I, is transmitted by fiber bundle F01 to an appropriately tilted o-x image plane at its opposite end. This end is tilted at an angle other than 90° with respect to the transmission direction of the fiber optics bundle. This o-x image plane is in turn imaged by lens L4 on the o-x object plane P. Lens L5 images the object plane P onto the face of fiber optic bundle F02, which reorients this tilted incident o-x image plane to a normal attitude relative to the image optical axis at its emergent face. The image sweeping across the o-x image plane on the exit face of bundle F02 is stabilized by reflection from rotating reflector M123, and imaged by lens L6 and L7 at stationary slit S2 through lens L8 and onto mirror M5. Light that passes through slit S2 is reflected by mirror M5 to the third facet of rotating reflector M123 and is imaged by lens L9 on the final image plane F. The rotation of mirror M123 scans the image of slit S2 across the final image plane to lay down a composite image. The Scheimpflug condition is satisfied in the illumination and the imaging systems by the action of the polished faces of the fiber optic bundles, the principle of which is explained in greater detail below.

Figure 2B:
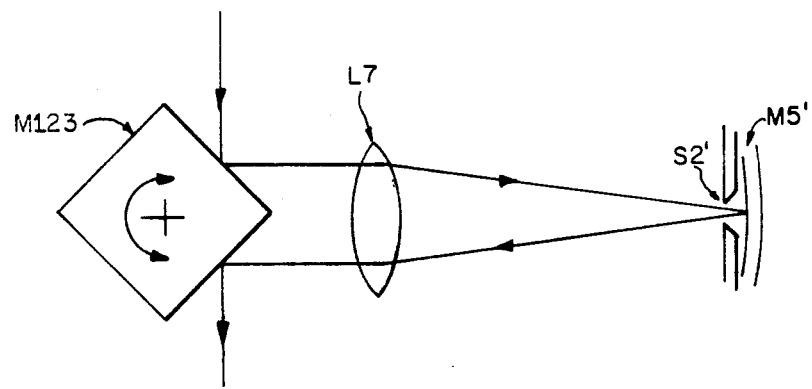
FIG. 2B illustrates an alternative embodiment of FIG. 2A with respect to mirror M5.

An alternative embodiment of the assembly comprising lens L8, slit S2, and mirror M5 of FIG. 2A consists of slit S2', and mirror M5' and is shown in FIG. 2B. In this embodiment, mirror M5' is a concave reflecting surface with a radius of curvature selected so as to perform the function of a field lens, as described earlier. The limiting apertures in this case are the second and third facets of mirror M123. Mirror M5' thereby combines the functions of mirror M5 and field lens L8 in FIG. 2A. Slit S2' is positioned as close as possible to mirror M5' so that almost all the light coming from the object which passes through slit S2' will pass again through the slit after reflecting from mirror M5'. Generally, the required curvature of the mirror and the length of the slit are such that the maximum departure from flatness of the mirror is no more than a few tenths of a millimeter.

Figure 2C:
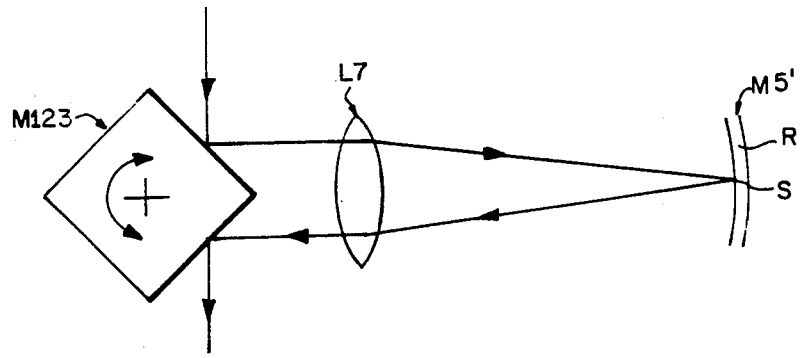
FIG. 2C illustrates a second alternative embodiment of FIG. 2A with respect to mirror M5.

FIG. 2C illustrates a third configuration which may be used in certain cases. In this embodiment, mirror M5' may be a concave surface, with only a narrow reflecting strip S which serves as the slit in the previous embodiments. The remainder of the curved surface R is either low-reflection coated or is otherwise treated to reflect a minimum of light back to the remainder of the optical system. Examples of the latter are flat black paint, or black anodized aluminum. In the embodiment of FIG. 2C, no separate slit is required, and the mirror M5' serves the functions of the slit, reflector, and field lens of the previous embodiments.

Figure 2D:
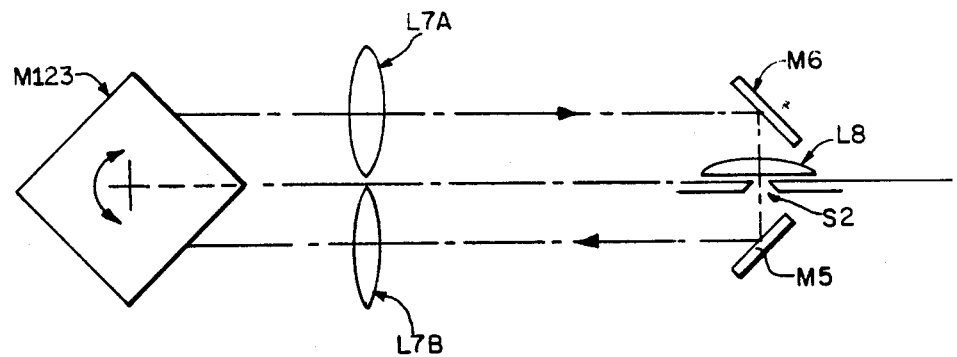
FIG. 2D illustrates yet another embodiment of FIG. 2A.

FIG. 2D illustrates a fourth configuration for slit S2, the advantage of which is that slit S2 is used in transmission. This avoids the problems of stray light reflected from the jaws of the slit and from the surfaces of field lens L8, as may occur in the systems shown in FIGS. 2A and 2B. The design illustrated in FIG. 2D also permits a variable slit width to be used, a feature that is not feasible with the system of FIG. 2C.

The design of the fiber optics image tilters deserves special attention. The fused bundles F01 and F02 consist of a multitude of individual light-conducting glass fibers which have been fused together to form a rigid structure. The arrangement of the fibers with respect to each other is the same at each end of the bundle. Each fiber consists of a cylindrical core of glass surrounded by a glass cladding, much as the insulation on a wire. The index of refraction of the cladding glass is lower than that of the core glass, so that light travels along the core by total internal reflection. In a fused bundle, each core retains its light-carrying capability, and is isolated from neighboring cores by its cladding layer.

When an image is formed at the entrance end of such a bundle, each fiber core picks up a portion of the image and transmits that portion, whether it be light, colored, or dark, to the other end of the fiber. At the exit end, the light emerging from all the fibers forms a reconstructed image of the image that was incident on the entrance end. One of the major applications of fiber optics, well known in the art, is image flattening. That is, an image which is formed on a curved surface can be transformed to a flat image through the use of an appropriately shaped fiber bundle. The application in the present invention could be termed "image tilting".

It will be apparent to those skilled in the art that the optimum shape for the entrance and exit faces of F01 and F02 may not necessarily be planar. Because of residual aberration in lenses L3 and L4, the optimum shapes may be curved, e.g., spherical, cylindrical, toric, or another aspheric surface.

The exit faces of the fiber optics bundle F01 must be at an angle appropriate to satisfy the Scheimpflug condition for lens L4 and object plane P. The inclined exit face will also serve to refract light which is incident internally on the exit face. The direction of refraction is shown in FIG. 2A. The magnitude of the angle of refraction is dictated by Snell's Law:

$$n_1 \sin \theta = \sin \phi$$

where $n_1$ is the index of refraction of the core glass in the fiber optics bundle; $\theta$ is the angle of incidence on the exit surface; and $\phi$ is the angle of refraction. Snell's Law applies, of course, to each individual light ray, an example being the ray shown in FIG. 2A.

In practice, light transmitted through a fiber is refracted and reflected a number of times. Therefore, light emerging from the exit end is generally in the form of a cone. If the exit end is inclined, as in FIG. 2A, the cone will have an elliptical crosssection, elongated in the direction parallel to the plane of the diagram. The maximum angle of the cone will depend on three factors: the angle of inclination of the end face, the cone of illumination incident on the entrance face of the fused bundle F01, and the socalled numerical aperture (NA) of the fibers. The numerical aperture is defined by the equation:

$$NA = \sqrt{[n_1^2 - n_2^2]}$$

where
$n_1$ = index of refraction of the fiber core; and
$n_2$ = index of refraction of the fiber cladding.

The designer's task is, therefore, to satisfy two conditions:
(a) the exit face of the fused bundle F0 must be at precisely the correct angle to satisfy the Scheimpflug condition; and
(b) the emerging cone of light from the exit face must be directed so that all or most of it is collected by lens L4.

To satisfy the second condition, the designer controls the angle of the bundle F01 with respect to the axis A, the indices of refraction of the core and cladding glasses, and the cone of illumination incident on the entrance face of F01. The above design techniques are well known to those skilled in the art.

Figure 3:
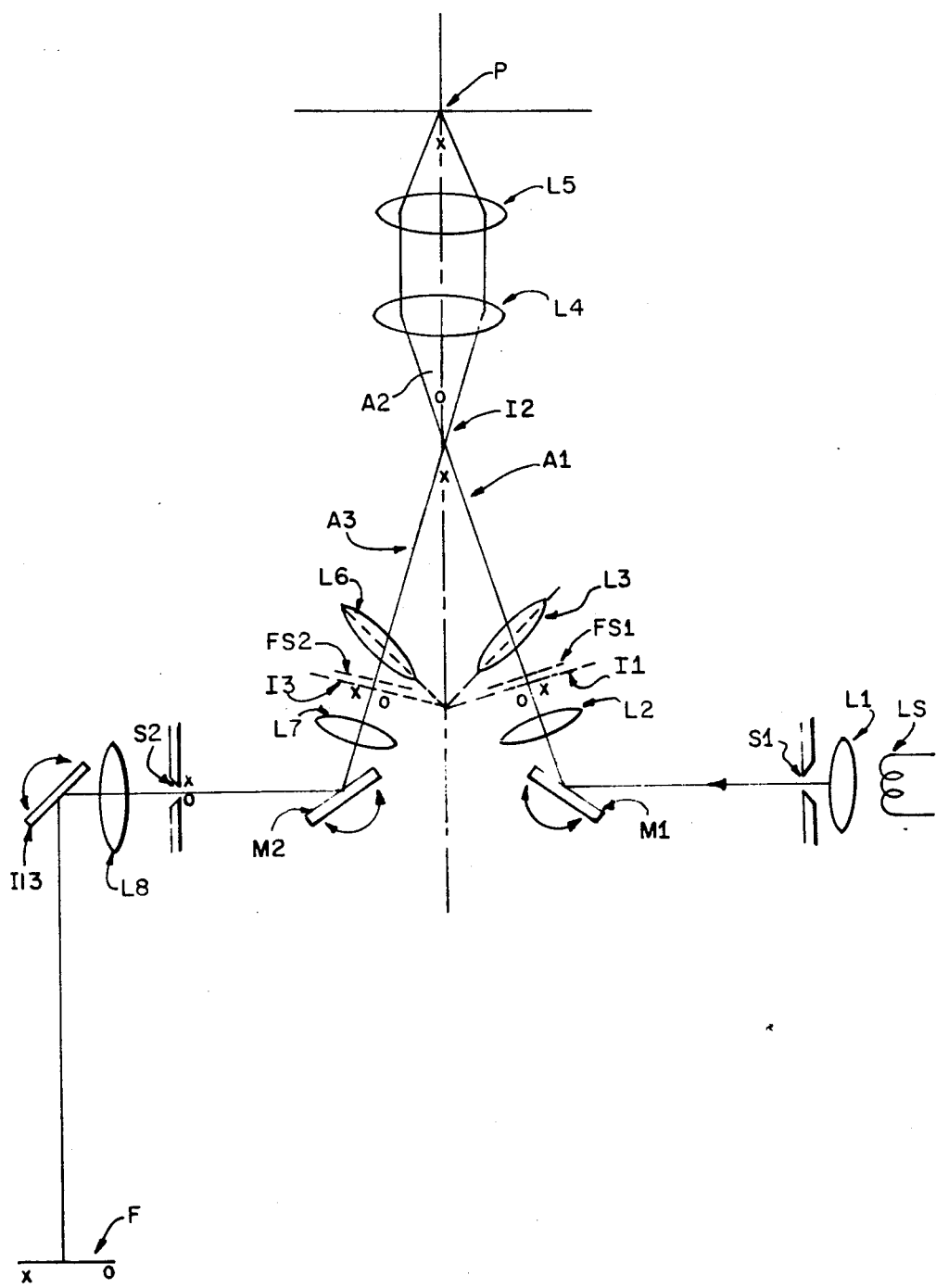
FIG. 3 is an optical diagram of another modified system according to the invention in which certain lenses serve for both illumination and imaging.

FIG. 3 illustrates another embodiment of the invention for use in an optical system employing objective lenses L4 and L5, through which both illumination and imaging rays are directed. Such a system is useful in certain types of microscopy, for example, where dual objectives, as shown in FIGS. 1 and 2, would not be practical.

Light from source LS passes through slit S1 and is then reflected from rotating mirror M1. The image of slit S1 is formed at an image plane I1 by lens L2. The image at plane I1 is perpendicular to the illumination optical axis A1. Lens L3 is tilted with respect to axis A1 so as to re-image the image at plane I1 onto plane A2 at image plane I2. As shown by the dashed lines, the Scheimpflug condition is satisfied by virtue of the orientation of lens L3. Thus, as the image of slit S1 scans from o to x on image plane I1, the image in image plane I2 will scan along the axis A2 from o to x.

Lenses L4 and L5 re-image the image at plane I2 onto object plane P, which contains the instrument axis A2. The specimen being examined is located in this region. Light reflected or scattered from the specimen is re-imaged at image plane I2 by lenses L4 and L5. As the image of slit S1 scans through the specimen from o to x, light returning from the specimen will be re-imaged by lenses L5 and L4 to form a slit image which, in turn, will scan from o to x in image plane I2.

Lens L6 is tilted so as to "rectify" the image, i.e., to produce an image at image plane I3 which is in a plane perpendicular to imaging axis A3, in accordance with the Scheimpflug condition. Lens L7, oriented perpendicular to the imaging axis A3, re-images the image from image plane I3 onto slit S2 after reflection from rotating mirror M2. If the illumination system is symmetrical with the imaging system as shown, and if mirror M2 rotates with the same angular velocity as mirror M1, but in the opposite direction, then the image of slit S1 formed on slit S2 will be stationary. Light coming from the illuminated slot image on plane P will pass through slit S2, but light from other regions of the specimen will be blocked by the slit jaws.

Lens L8 re-images slit S2 onto final image plane F. The reflection from rotating mirror M3 causes the image of slit S2 to be swept across the final image plane F. The image of object plane P is laid down strip-by-strip on final image plane F as the image of slit S2 sweeps across final image plane F.

In order to form an image on plane F, the proper relationship must exist between certain parameters. First, lens L8 must have the proper power to form the image of plane I3 on plane F. Second, at the slit S2, the velocity of an image point produced by the rotation of mirror M2 must be exactly compensated by the rotation of mirror M3. When the second condition is expressed in measurable quantities, the condition becomes:

$$V_2 k = -V_3(x_1 + x_2 - x_1 x_2 P)$$

where
$V_2$ = angular velocity of mirror M2;
$V_3$ = angular velocity of mirror M3;
$k$ = distance from M2 to slit S2 (in meters);
$x_1$ = distance from M3 to lens L8 (in meters);
$x_2$ = distance from L8 to S2 (in meters); and
$P$ = power of lens L8 (in diopters).

For convenience of manufacture, it may be preferred to have oscillating mirrors with the same oscillation amplitude and velocity. The instantaneous direction of rotation must be opposite so that $V_3 = -V_2$. In this case, the requirement reduces to $$k = x_1 + x_2 - x_1 x_2 P.$$

In the illumination system, it is necessary to employ a stop which limits the illumination rays to no more than half of lens L4. If the entire lens were illuminated, the reflection from the lens surfaces would be picked up by the imaging system (in particular, lens L6), and would contribute stray light to the image. In principle, an aperture stop should be placed in the illumination system at a point conjugate to the lens L4. Because of the short distance between L3 and I1, the conjugate of L4 falls very close to the image plane I1. It may, therefore, be sufficient to use a field stop (FS1) in the image plane I1 for the dual purpose of defining the total field to be scanned and of limiting the illumination rays to half of the aperture of lens L4.

It is desirable to place a field stop (FS2) in the image plane I3 as well, symmetrical to that in I1.

Lenses L4 and L5 are required to form images over a range of conjugate distances, i.e., from o to x. Many high-performance lenses have their aberrations corrected only over a narrow range of conjugate distances. This will necessarily limit the width of the image that is well corrected. It is, therefore, necessary to select those lenses which have as wide a range of conjugate distances as is possible. Future possibilities include the design to lenses with extended conjugate ranges.

Figure 4:
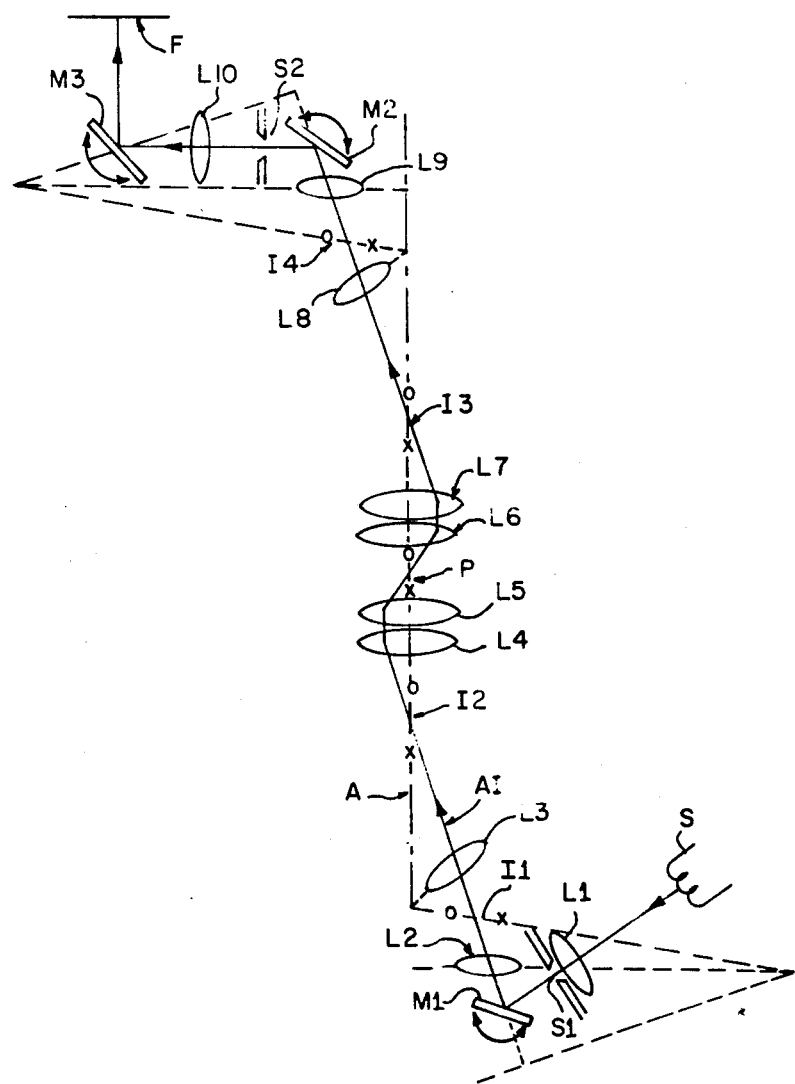
FIG. 4 is an optical diagram of another modified system according to the invention in which microscope illumination is provided by transillumination.

FIG. 4 illustrates the case of a transmitted light microscope. In this arrangement, the tilting of the illumination plane is divided between lenses L2 and L3, both of which are tilted relative to the illumination axis. As shown, light from source S is collected by lens L1 and passes through slit S1. After reflecting from the first oscillating mirror M1, the light is focused by tilted lens L2 to image plane I1, which is inclined with respect to illumination axis A1. The dashed lines are the construction lines illustrating that the Scheimpflug condition has been satisfied. Tilted lens L3 re-images the image of image plane I1 to image plane I2. The latter image in plane I2 lies in the plane containing the axis A of the microscope, which passes through the centers of lenses L4, L5, L6, and L7. Image I2 is re-imaged by lenses L4 and L5 to object plane P, the location of the specimen to be examined. As mirror M1 rotates clockwise, the image of slit S1 scans in the direction o-x in each of the image planes I1 and I2, and object plane P.

Lenses L6 and L7 re-image plane P to image plane I3, and tilted lens L8 forms another image at image plane I4. The light is then focused by lens L9 and reflected from oscillating mirror M2 to form a stationary image of slit S1 at slit S2. As indicated by the drawing, the optical system from object plane P to slit S2 is symmetrical with the optical system from object plane P to S1. When mirror M1 rotates clockwise, mirror M2 must be rotated counterclockwise with the same angular velocity.

Following slit S2, lens L10 and oscillating mirror M3 form the final image on final image plane F. Mirror M3 must be rotating clockwise when mirror M1 is rotating clockwise.

Figure 5:
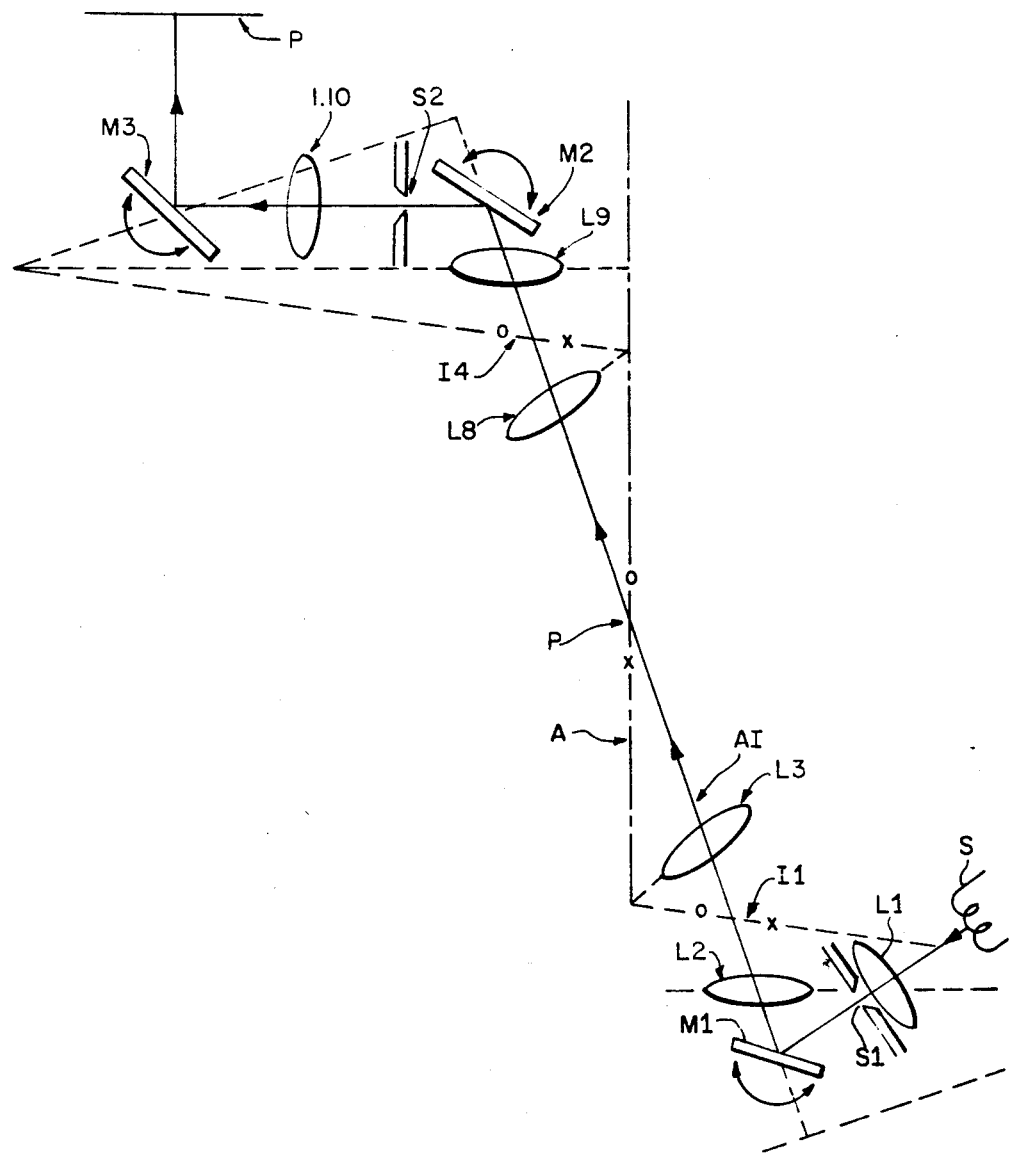
FIG. 5 is an alternative embodiment to that shown in FIG. 4.

As shown in FIG. 4, the system employs lenses L4, L5, L6, and L7. The functions of lenses L4 and L5 could be combined into a single objective of appropriate design; similarly, L6 and L7 may also be combined. It is also possible to eliminate lenses L4, L5, L6, and L7 entirely, as illustrated in FIG. 5. The design is basically the same as in FIG. 4, except that the upper and lower portions of the system are brought closer together so that image plane I3 coincides with I2. The object is then placed at this location, designated P in FIG. 5. While this provides a simpler system, it will not permit the high numerical aperture which is possible in the system of FIG. 4.

The system as shown in FIG. 4 is set up for bright-field microscopy. To achieve dark-field microscopy, illumination light which passes directly through the object without deviation must miss the image-forming optics. This can be accomplished by reversing the illumination system from that shown, i.e., all components below lens L4 are moved to the opposite side of axis A in a symmetrical fashion.

Figure 6:
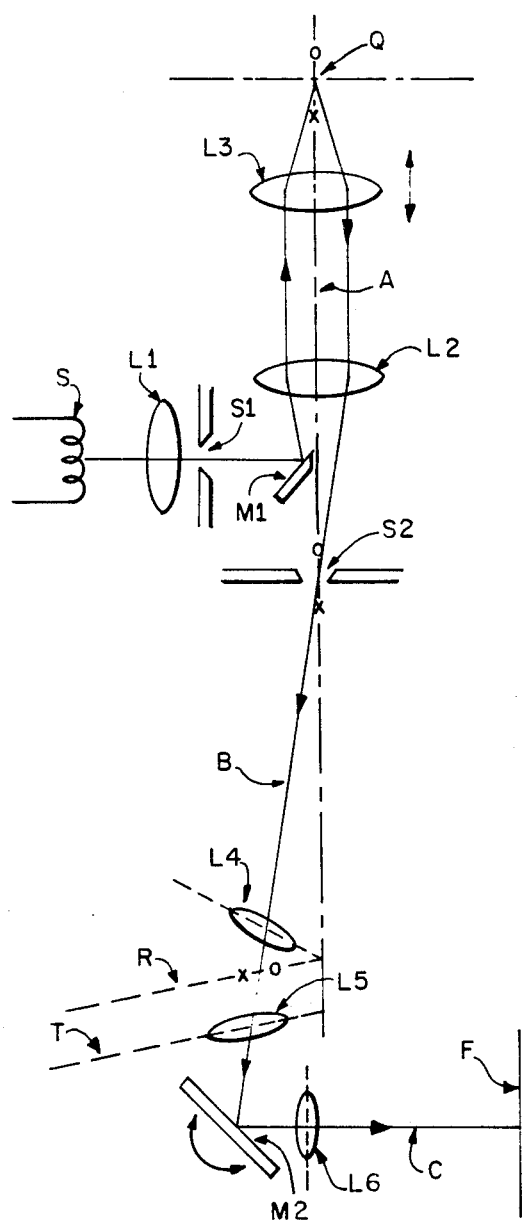
FIG. 6 is an optical diagram of another modified system according to the invention in which a moving lens is combined with a scanning mirror to achieve the longitudinal scanning and imaging of the object.

FIG. 6 illustrates a method for obtaining the axial scanning motion through the use of an oscillating lens. Light from slit S1 reflects from stationary mirror M1 to Lens L2. The action of lenses L2 and L3 is to image slit S1 on the axis at the point Q on the object plane. The light retaining from Q is imaged by the lenses L2 and L3 to the slit S2. Slits S1 and S2 each lie at the focal point of lens L2. The scanning action is accomplished by moving lens L3 along axis A in an oscillating fashion. The image of slit S1 will then move along axis A, remaining at the second focal point of lens L3. Any light returning from this image of slit S1 to lens L3 will be re-imaged at slit S2. Slit S2 is imaged by means of lenses L4, L5, and L6 onto final image plane F. Tilted lens L4 forms a tilted image of the object plane at image plane R. Considering the Scheimpflug condition involving image plane R, lens L5, and the image formed by L5; lens L5 is tilted at the same angle as image R relative to the axis B. Therefore, its Scheimpflug construction line T is parallel to image plane R. Plane R is the focal plane of lens L5, therefore the image of R formed by the lens L5 is at infinity. The Scheimpflug construction line for the image plane is therefore at infinity, and it intersects the other two Scheimpflug construction lines at infinity.

Since the image of plane R is projected to infinity by lens L5, lens L6 can be oriented perpendicular to the axis C, and it will form an image at its focal plane F (the final image plane), also normal to the axis C. When mirror M2 is oscillated in synchronism with the motion of lens L3, a composite image will be laid down, strip by strip, on focal plane F. Of course, the rotation of mirror M2 must be synchronized with the motion of lens L3.

Numerous variations of the method outlined in conjunction with FIG. 6 are possible. For example, instead of moving lens L3, the preceding lens, L2, could be moved along the axis. This would have the advantage of placing the moving part internal to the apparatus. However, such a system would suffer from the disadvantage of using both lenses L2 and L3 over a range of conjugate distances, thus making the optical design of these lenses somewhat more difficult.

According to another variation, a very narrow slit S2 is used which is only as wide as one resolvable image element. In this case, lenses L4 and L5 do not have to be tilted because only a line is being imaged on final image plane F at any one instant.

Figure 7:
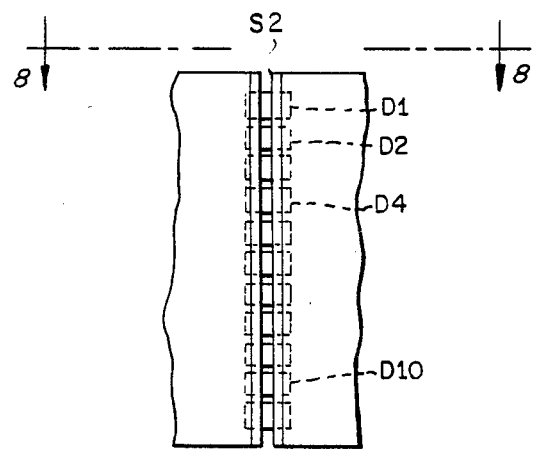
FIG. 7 illustrates a linear array of detectors positioned at the final image plane.
Figure 8:
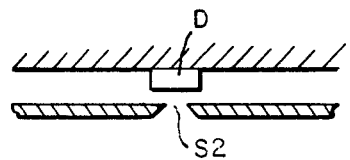
FIG. 8 is a top view along line 8—8 of FIG. 7.

In the systems considered up to this point, a final image has been formed on final image plane F by an optical means which follows slit S2. There are other applications for which it is desirable to employ a detector or an array of detectors following slit S2. For example, as shown in FIGS. 7 and 8, a closely spaced linear array of detectors D placed behind a narrow slit S2 will generate a set of electrical signals which can then be used for a number of purposes. First, the signals can be used to generate a cathode-ray tube (CRT) display of the image, provided that the sweep speeds of the oscillating mirror and of the CRT are synchronized. Second, the signals can be processed to yield information on the axial location of reflecting and scattering centers within the object. The thickness of a transparent object, for example, is determined by the time elapsed between the two peak signals received from reflection at the two surfaces. Or, the depth of scattering material within the human lens can be determined, as an aid in the study and diagnosis of cataracts. In cases for which the magnification is not constant over the field, a correction must be applied. The detectors are placed immediately following the slit S2 in any of FIGS. 1, 2A, or 3-6. If the detectors are sufficiently narrow, slit S2 may be eliminated and the detectors can be placed at the previous location of slit S2. In some cases, it would be sufficient to utilize only one detector behind the slit. An example would be in the determination of the thickness of a transparent material of essentially uniform thickness.

Many other variations are possible utilizing tilted lenses or combinations of fused fiber bundles together with lenses to produce image tilt. While the invention has been illustrated with reference to embodiments in which the object plane is parallel to the axis of the instrument, by utilizing the Scheimpflug condition and the scanning principles of this invention, it is possible to form an image of an object plane having any angle with respect to the axis of the system.

Optical systems as described above are expected to find application in the following areas:

(1) Examination of the cornea, anterior chamber, and eye lens, as is now done with an instrument known as a slit lamp, but with greater magnification and resolution than was previously possible.

(2) Quantitative assessment of cornea and eye lens opacities, using photography and photoelectric detectors.

(3) Quantitative thickness measurements of the cornea, anterior chamber, and eye lens.

(4) Examination of the depth characteristics of "flat" preparations, in which the relationship of structures at different levels is important, e.g., the retina.

(5) Examination of the eye vitreous, in vivo and in vitro.

(6) Determination of the surface profile of biological and other materials. One example of importance in ophthalmology is the profile of the optic disk. Another example is the shape of the zone between the cornea and the iris in the eye, known as the angle.

Although the invention has been described with respect to particular means and arrangements of lenses and slits, it is to be understood that the key aspect of the invention is the examination of a plane positioned at an angle other than normal to the illumination axis of the instrument by satisfying the Scheimpflug condition. Therefore, alternative embodiments beyond those specifically disclosed are possible using the principles set forth herein and falling within the scope of the claims which follow.

I claim:

1. A method of viewing an object plane with an optical instrument adapted to illuminate said object plane with illumination light along an illumination axis and for forming an image of said object plane along an image onto a final image plane, said optical instrument having an instrument axis, said instrument axis being the bisector of the angle between said illumination and image axis, said object plane being positioned such that said instrument axis is at an angle which is non-normal relative to said object plane, said method comprising the steps of:

(a) scanning said illumination light across said object plane;

(b) imaging said object plane onto said final image plane to form a focused image; and (c) rectifying said final image plane with image rectifying means adapted to satisfy the Scheimpflug conditions.

2. The method as defined by claim 1 comprising illuminating successive portions of said object plane by illuminating said object plane with slit-shaped illumination and scanning said slit-shaped illumination over successive portions of said object plane.

3. The method as defined by claim 2 comprising scanning said slit-shaped illumination over said successive portions of said object plane by reflecting slit-shaped illumination from a first oscillating mirror onto said object plane.

4. The method as defined by claim 3 further comprising reflecting light from said object plane by means of a second oscillating mirror, said second oscillating mirror oscillating substantially synchronously with said first oscillating mirror.

5. The method as defined by claim 4 further comprising reflecting said light from said second oscillating mirror onto a third oscillating mirror rotating synchronously with said first and second oscillating mirrors and laying down successive portions of an image of said object plane on said final image plane.

6. The method as defined by claim 1 wherein said illumination axis is at an angle non-normal to said object plane, said method further comprising tilting the plane of illumination of said object plane with illumination tilting means positioned to satisfy the Scheimpflug condition.

7. The method as defined by either of claims 1 or 6 wherein said image axis is at a non-normal angle to said object plane.

8. The method as defined by claim 7 comprising scanning said object plane with slit-shaped illumination, said method further comprising reflecting said slit-shaped illumination from a first oscillating mirror onto said object plane through said illumination tilting means.

9. The method as defined by claim 8 further comprising reflecting said image of said object plane from a second oscillating mirror, said second oscillating mirror being adapted to oscillate synchronously with said first oscillating mirror.

10. The method as defined by claim 9 further comprising reflecting said image of said object plane from said second oscillating mirror onto a third oscillating mirror adapted to rotate synchronously with said first and second oscillating mirrors to lay down a succession of slit-shaped portions of said object plane on said final image plane.

11. The method as defined by claim 6 wherein said illumination tilting means comprises at least one lens positioned relative to said illumination axis to satisfy the Scheimpflug condition.

12. The method as defined by claim 7 wherein said image rectifying means comprises at least one lens positioned relative to said image axis to satisfy the Scheimpflug condition.

13. The method as defined by claim 6 wherein said illumination tilting means includes a fiber optics bundle with at least one end tilted at an angle other than 90° with respect to the transmission direction of said fiber bundle.

14. The method as defined by claim 7 wherein said image rectifying means comprises at least one fiber optics bundle.

15. The method as defined by claim 1 further comprising reflecting said illumination from a first oscillating mirror to thereby scan said illumination over said object plane, reflecting the image leaving said object plane from a second oscillating mirror oscillating synchronously with said first oscillating mirror, and reflecting said image of said object plane from a third oscillating mirror rotating synchronously with said first and second oscillating mirrors whereby the image reflected from said third oscillating mirror is scanned across said final image plane.

16. The method as defined by claim 15 wherein said first, second, and third oscillating mirrors are three facets of an oscillating mirror.

17. The method as defined by claim 15 further comprising forming said illumination into slit-shaped illumination, said method further comprising passing the image of said object plane reflected from said second oscillating mirror through a slit prior to being reflected from said third oscillating mirror.

18. The method as defined by claim 17 comprising passing said image of said object plane reflected from said second oscillating mirror through a lens positioned in front of said slit and reflecting said image off of a mirror positioned behind said slit back through said slit and said lens and onto said third oscillating mirror.

19. An optical system for imaging an object plane onto a final image plane, said optical system adapted to illuminate said object plane with illumination light along an illumination axis in an illumination system and for imaging said object plane along an image axis in an imaging system, said optical system having an instrument axis, said instrument axis being the bisector of the angle between said illumination and image axes, wherein said instrument axis is non-normal to said object plane, said system comprising:

(a) illumination means for illuminating said object plane;

(b) scanning means for scanning said illumination across said object plane;

(c) image means for imaging said object plane onto said final image plane; and (d) image rectifying means for rectifying the image of said object plane to render it perpendicular to said image axis by means of at least one lens positioned relative to the image axis so as to satisfy the Scheimpflug condition.

20. The system as defined by claim 19 comprising means for forming said illumination into slit-shaped illumination.

21. The system as defined by claim 20 wherein said scanning means comprises a first oscillating mirror adapted to reflect said illumination onto said object plane whereby said slit-shaped illumination is scanned as said oscillating mirror is oscillated.

22. The system as defined by claim 21 further comprising a second oscillating mirror adapted to oscillate substantially synchronously with said first oscillating mirror.

23. The system as defined by claim 22 further comprising a third oscillating mirror adapted to oscillate substantially synchronously with said first and second oscillating mirrors and positioned to receive said image of said object plane reflected from said second oscillating mirror and thereby laying down successive portions of an image of said object plane on said final image plane.

24. The system as defined by claim 19 further comprising illumination tilting means for tilting the plane in which said slit-shaped illumination is scanned relative to said illumination axis.

25. The system as defined by either of claims 19 or 24 further comprising a first oscillating mirror adapted to scan said illumination light over said object plane.

26. The system as defined by claim 25 further comprising a second oscillating mirror adapted to oscillate substantially synchronously with said first oscillating mirror.

27. The system as defined by claim 26 further comprising a third oscillating mirror adapted to oscillate substantially synchronously with said first and second oscillating mirrors to lay down successive portions of an image of said object plane in synchronism with the scanning of said object plane by said first oscillating mirror.

28. The optical system as defined by claim 24 wherein said illumination tilting means comprises at least one lens positioned relative to said illumination axis so as to satisfy the Scheimpflug condition.

29. The optical system as defined by claim 19 wherein said image rectifying means comprises at least one lens positioned relative to said image axis so as to satisfy the Scheimpflug condition.

30. The optical system as defined by claim 24 wherein said illumination tilting means comprises at least one fiber optics bundle.

31. The optical system as defined by claim 19 wherein said image rectifying means comprises at least one fiber optics bundle.

32. The optical system as defined by claim 19 comprising a first oscillating mirror adapted to scan said illumination light over said object plane, a second oscillating mirror adapted to rotate substantially synchronously with said first oscillating mirror positioned to reflect image forming light from said object plane onto a third oscillating mirror, said third oscillating mirror being adapted to oscillate substantially synchronously with said first and second oscillating mirrors and positioned to lay down successive portions of an image of said object plane on said final image plane in synchronism with the scanning of said illumination across said object plane.

33. The optical system as defined by claim 32 wherein said first, second, and third oscillating mirrors are facets on a single oscillating mirror.

34. The optical system as defined by claim 32 further comprising a first slit positioned to form said illumination light into a slit shape whereby slit-shaped illumination is scanned across said object plane, and said optical system further comprises a second slit positioned along said image axis.

35. The optical system as defined by claim 34 further comprising a mirror positioned directly behind said second slit whereby said image of said object plane passes through said second slit and is reflected from said mirror back through said slit and through a lens positioned directly in front of said second slit.

36. An optical system as defined by claim 19 further comprising at least one photodetector positioned at said final image plane.

37. A method of viewing an object plane with an optical instrument adapted to illuminate said object plane with illumination light along an illumination axis and for forming an image of said object plane along an image axis onto a final image plane, said object plane being positioned such that said illumination axis is at an angle which is non-normal relative to said object claim, said method comprising the steps of:
(a) tilting the plane of illumination of said object plane with illumination tilting means positioned to satisfy the Scheimpflug condition;
(b) scanning said illumination light across said object plane; and
(c) imaging said object plane onto said final image plane.

38. An optical system for imaging an object plane onto a final image plane, said optical system adapted to illuminate said object plane with illumination light along an illumination axis in an illumination system and for imaging said object plane along an image axis in an imaging system, said optical system having an instrument axis, said instrument axis being the bisector of the angle between said illumination and image axes, wherein said instrument axis is non-normal to said object plane, said system comprising:
(a) illumination means for illuminating said object plane;
(b) scanning means for illuminating said object plane;
(c) image means for imaging said object plane onto said final image plane; and
(d) means for tilting the plane of illumination of said object plane with illumination tilting means positioned to satisfy the Scheimpflug condition.

39. The method as defined by claim 1 comprising illuminating said object plane along one side thereof and imaging said object plane from the other side thereof.

40. The method as defined by claim 17 comprising reflecting the image passing through said slit from a concave mirror positioned behind said slit back through said slit onto said third oscillating mirror.

41. The method as defined by claim 15 comprising illuminating said object plane with slit-shaped illumination being scanned across said object plane by reflection from said first oscillating mirror and reflecting said image from said second oscillating mirror onto a concave mirror comprising a slit-shaped reflective area adapted to reflect said image onto said third oscillating mirror, said concave mirror being essentially non-reflective except for said slit-shaped reflective area.

42. The method as defined by claim 1 comprising passing said illumination light and said image of said object plane through at least one common lens.

43. The method as defined by claim 1 comprising illuminating and imaging said object plane from opposite sides of said object plane in such a manner that in the absence of an object said illumination light passes directly through said object plane and is imaged on said final image plane.

44. The method as defined by claim 43 further comprising transilluminating said object plane.

45. The method as defined by claim 1 comprising passing said illumination light and said image of said object plane through at least one objective lens, said method further comprising varying the position of said at least one objective lens relative to said object plane to scan said illumination over said object plane and thereby receiving said image of said object plane leaving said object plane.

46. The system as defined by claim 19 wherein said illumination means is adapted to generate illumination, and said image means is adapted to image said object plane, on opposite sides of said object plane.

47. The optical system as defined by claim 34 further comprising a concave mirror positioned directly behind said second slit adapted to reflect said image of said object plane passing through said second slit back through said second slit.

48. The optical system as defined by claim 34 further comprising a concave mirror, said concave mirror comprising a second slit in the form of a slit-shaped reflective portion, the remainder of said concave mirror being substantially nonreflective.

49. The optical system as defined by claim 34 wherein said second slit is positioned so that said image of said object plane passes only once through said second slit.

50. The optical system as defined by claim 19 further comprising at least one lens positioned so that both of said illumination said imaging axes pass through said lens.

51. The optical system as defined by claim 19 wherein said illumination means and said image means are positioned so that in the absence of an object the illumination light passes directly into said image means.

52. The optical system as defined by claim 51 comprising lenses positioned for transillumination of the object.

53. The optical system as defined by claim 19 further comprising an objective positioned adjacent to said object plane, said objective being adapted to move relative to said objective plane for purposes of scanning said illumination over said object plane, and positioned whereby said image of said object plane passes therethrough.

54. The optical system as defined by claim 19 comprising a first oscillating mirror adapted to scan said illumination over said object plane, a second oscillating mirror adapted to rotate substantially synchronously with said first oscillating mirror and positioned to reflect said image forming light from said object plane onto an image plane, and at least one photodetector arranged at said image plane to receive said image forming light.

55. The optical system as defined by claim 54 further comprising a slit-shaped aperture located at said image plane, said at least one photodetector located behind said slit-shaped aperture so that only light passing through said slit-shaped aperture reaches said at least one photodetector.

* * * * *